(12) United States Patent
Misaka et al.

(10) Patent No.: US 7,146,513 B2
(45) Date of Patent: Dec. 5, 2006

(54) SYSTEM FOR ADJUSTING A CLOCK FREQUENCY BASED ON COMPARING A REQUIRED PROCESS TIMES AND A WORST CASE EXECUTION TIMES AND ADJUSTING A VOLTAGE AND CLOCK FREQUENCY BASED ON A NUMBER OF READY STATE APPLICATION TASKS

(75) Inventors: Satoshi Misaka, Kokubunji (JP); Naohiko Irie, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 10/772,438

(22) Filed: Feb. 6, 2004

(65) Prior Publication Data

US 2005/0138452 A1 Jun. 23, 2005

(30) Foreign Application Priority Data

Dec. 17, 2003 (JP) .............................. 2003-418908

(51) Int. Cl.
G06F 1/26 (2006.01)
G06F 9/46 (2006.01)
G06F 1/04 (2006.01)

(52) U.S. Cl. ...................... 713/320; 718/100; 713/500; 713/600

(58) Field of Classification Search ................ 713/300, 713/322, 500, 600; 718/100
See application file for complete search history.

(56) References Cited

U.S. PATENT DOCUMENTS 4,145,735 A * 3/1979 Soga .......................... 710/264
4,408,273 A * 10/1983 Plow .......................... 707/202
4,951,189 A * 8/1990 Onodera et al. .............. 700/12

(Continued)

FOREIGN PATENT DOCUMENTS

JP 2003-6179 6/2001

(Continued)

OTHER PUBLICATIONS

Nutt Gary J., Operating Systems: A Modern Perspective, 2000, Addison-Wesley, 2nd Ed., pp. 160-161.*

Primary Examiner—Chun Cao
Assistant Examiner—Mark Connolly
(74) Attorney, Agent, or Firm—Reed Smith LLP; Stanley P. Fisher, Esq.; Juan Carlos A. Marquez, Esq.

(57) ABSTRACT

An information processing system that can reduce its power consumption by means of robust power controlling even upon occurrence of an interruption/exception processing. If it is found that there is no task set in the ready state as a result of watching the number of tasks set in the ready state by the RTOS or ready state watching task, the system controls the RTOS or ready state watching task so as to lower the power while the current active task controls the power according to the preset WCET of each application slice. On the contrary, if there is any task set in the ready state, the system controls so as to raise the power and the current active task comes to control the power according to the virtual WCET that is earlier than the WCET of each application slice. And, if there is no task set in the ready state and there is no current active task, the system controls so that the RTOS or both of the ready state watching task and sleep task lower the power. This is why the present invention can reduce the power consumption of the subject information processing system.

13 Claims, 16 Drawing Sheets

U.S. PATENT DOCUMENTS

| | | | |
|---|---|---|---|
| 6,000,035 A * | 12/1999 | Matsushima et al. | 713/320 |
| 6,298,448 B1 * | 10/2001 | Shaffer et al. | 713/322 |
| 7,036,032 B1 * | 4/2006 | Mizuyabu et al. | 713/323 |
| 2002/0194513 A1 | 12/2002 | Ishibashi et al. | |

FOREIGN PATENT DOCUMENTS

| | | |
|---|---|---|
| JP | 2003-140787 | 11/2001 |
| WO | WO 206949 A2 * | 1/2002 |

* cited by examiner

SYSTEM FOR ADJUSTING A CLOCK FREQUENCY BASED ON COMPARING A REQUIRED PROCESS TIMES AND A WORST CASE EXECUTION TIMES AND ADJUSTING A VOLTAGE AND CLOCK FREQUENCY BASED ON A NUMBER OF READY STATE APPLICATION TASKS

FIELD OF THE INVENTION

The present invention relates to an information processing system and a software program installed in the information processing system.

BACKGROUND OF THE INVENTION

FIG. 18 shows a block diagram of a conventional power control unit shown in FIG. 5, which uses a power control method and a power control program described in the patent document 1. The conventional power control unit is a battery-driven portable one that includes a processor that may be any of a portable telephone, a portable audio device, a portable video camera, a lap-top personal computer, and a PDA (Personal Digital Assistants) device that uses a technique for optimizing its power consumption.

The conventional power control unit as shown in FIG. 18 includes a central processing unit (CPU) (hereinafter, to be referred to as the processor) (21) controlled by software (25) and a power control unit (22). The power control unit (22) is configured by a source voltage/threshold voltage controller, a clock frequency generator, and a timer. The source voltage/threshold voltage controller (hereinafter, to be referred to as the variable DC/DC converter) controls the source voltage or threshold voltage to be applied to the processor (21).

The clock frequency generator (hereinafter, to be referred to as the CPG (Clock Pulse Generator) generates a clock pulse to be supplied to the processor (21) and controls the time width of the clock pulse, that is, a clock frequency. The timer counts the number of pulses at fixed time intervals and supplies the result, that is, time information to the software (25). The timer receives timer clock pulses from the CPG to count the time at fixed time intervals set beforehand by the software (25). The timer clock pulse is different from the clock pulse supplied to the processor (21) from the CPG.

The software (25) is configured by an operating system (hereinafter, to be referred to as the RTOS) (23), a single or plurality of tasks (24), etc. The RTOS (23) retains a single or plurality of executable ready state tasks arranged in order they are to be started or in order of priority. The RTOS (23) can also supply the starting time of the first task to be started to the current active task (24). Each of user programs equivalent to application and middleware programs, etc., as well as the power control program are included in such a single or plurality of tasks (24).

The power control program integrates an execution time between the starting time assigned to the processor (21) with respect to the current active task (24) and the current time to calculate the time to spare in the current active task (24) from the integrated execution time and a preset worst case execution time (hereinafter to be referred to as the WCET) of each target application slice of the subject application program or middleware program. An application slice means each of N slices 1, 2, 3, . . . , N obtained by dividing a task. The WCET of each of the slices 1, 2, 3, . . . , N and the WCET between a given slice and the slice N are obtained through analysis and measurement respectively. If there is any time to spare, the current active task (24) shown in FIG. 18 issues a system call SC to the RTOS (23). The SC is used to set a source voltage and a clock frequency that are both desired. After completing the internal processing in the RTOS (23), the software (25) sends a command C shown in FIG. 2 to the variable DC/DC converter. Receiving the command C, the variable DC/DC converter sets both source voltage and clock frequency that are desired by the software (25) and sends a control signal CS to the processor (21). The processor (21), when receiving the control signal CS, comes to be driven at the source voltage and the clock frequency.

Next, a description will be made for the operation of a task (24) in the RTOS (23). FIG. 19 shows how the state of the task (24) changes in the RTOS. There are four states of the task, that is, the running state (31), the waiting state (32), the ready state (33), and the initial state (34). The initial state (34) means a state in which the subject task (24) is not generated yet. The subject task (24) is generated as follows; at first, an existing task (24a) issues a task generation system call supplied from the RTOS (23) to the system, then the subject task is generated as a task (24c), which then goes into the ready state (33). In the running state (31), the subject task (24) occupies the processor (21) to execute a predetermined processing. In the waiting state (32), the subject task (24d) that has completed the predetermined processing issues an event waiting system call supplied from the RTOS (23) to the system to go out of the running state (31) and enables a different task (24) to occupy the processor (21). The subject task then waits for another event. The task (24d) in the waiting state, when receiving a self-start-up event, goes into the ready state (33).

In the ready state (33), executable tasks (24a) to (24c) are waiting to be allowed to occupy the processor (21) in order of task priority. The task (24a) having the highest task priority among the ready state tasks (24a) to (24c) at that time is dispatched (35) into the running state (31). And, if the task priority of the task (24d) that has moved into the ready state (33) from the waiting state (32) according to the received start-up event is higher than that of the current active task (24a), the current active task (24a) passes the CPU occupation to the task (24d), thereby the task (24a) is pre-empted (36) into the ready state (33). At the same time, the task (24a) waits to be allowed to go into the running state (31) according to its task priority.

[Patent Document 1] JP-A No. 140787/2003

In prior to the description of this specification, the inventor et al of the present invention have examined the conventional technique of the power control unit described in the patent document 1, particularly with respect to battery-driven information processing systems represented by portable telephones, PDAs, portable digital cameras, portable digital video players, portable digital video cameras, portable digital audio recorders and players, etc.

FIG. 20 is a concept chart of a power control method created by the inventor et al of the present invention so as to use it for the power control unit described in the patent document 1. FIG. 20 is not included in the patent document 1. The vertical axis denotes the processing step of each application slice in an application program and the horizontal axis denotes the processing time of the application program. It is premised here that the number of application slices is K slices. An output time (11) is assumed to be known beforehand. It is also assumed here that the specification of the application program is completed or the processing result of the application program is output in time for the output time (11).

The power control technique described in the patent document 1 controls both source voltage and clock frequency. Consequently, to optimize a power, that is, to minimize the target power consumption, both source voltage and clock frequency must be lowered. And, lowering the clock frequency means executing the processing of the target application program step by step. To realize reduction of such power consumption more effectively, the processing of the target application program must be executed at a low clock frequency up to the last moment of the output time (11). This is why the inventor et al of the present invention have decided to assign the same time interval output time (13) to each application slice according to a linear programming method so that the processing of the application program started at a task starting time (12) will end surely in time for the output time (11). The inventor et al. of the present invention have also assigned a WCET (14) to each application slice beforehand. The WCET (14) is a time interval that is an integer multiple of each sub-output time of which counting begins at the task starting time (12). For example, the WCET (14c) of the k-th application slice set according to the basis of the linear programming method is equivalent to an integrated estimation time obtained by multiplying the sub-output time (13) by k.

At each power control check point (6), a comparison is made between the integrated execution time (15) of the processor (21) counted from the task starting time (12) and the WCET (14) of each application slice (4) to control both of the source voltage and the clock frequency sequentially. For example, assume now that the power control unit can use two combinations of a high source voltage and a high clock frequency, as well as a low source voltage and a low clock frequency to make the above power controlling. If a time difference obtained by subtracting the integrated execution time (15) at the k-th processing ending point (16) of the application slice (4c) counted from the task starting time (12) from the (k−1)-th processing WCET (14d) of the application slice (4d) is greater than the time difference between the (k+1)-th processing WCET (14d) of the application slice (4d) and the k-th processing WCET (14c) of the application slice (4c), that is, a time value obtained by multiplying the sub-output time (13) between the k-th and the (k+1) by a multiple of the high clock frequency, the power consumption is reduced at the k-th processing ending point (16). The output time (11) can be observed strictly, since it is expected that both of the source voltage and the clock frequency that are lowered as described above can be within the WCET (14d) at the (k+1)-th power control check point (6). On the contrary, if the above comparison result becomes smaller, the power must be increased. In other words, both of the source voltage and the clock frequency must be raised. Otherwise, the output time (11) cannot be observed strictly.

As a result of the above examination, it is found that even when the power control unit shown in FIG. 18 is used for the information processing system, two problems related to the optimization of power consumption (energy-saving) are still remained unsolved.

One of the problems causes an event that if an interruption processing is requested to the current active task (24a), the processing of the interrupted task (24a) in the ready state (33) is delayed by the execution time of the high priority task (24d) to be started, so that the time to spare comes to differ from the absolute time up to the output time (11), thereby the power control timing is lost. Hereinafter, such an event will be described with reference to FIG. 21.

FIG. 21 is a graph for describing how the processing of an interrupted task is delayed. For example, if the current active task (24a) is interrupted by a different high priority task (24d) while the k-th application slice (4c) is processed, the interrupted task (24a) is pre-emptied (36), thereby the processing stops. The interrupted task (24a) is dispatched (35) into the running state (31) again when the processing of the task (24b) that has interrupted ends.

However, because the absolute time goes on even while the processing of the interrupted task (24a) stops, the absolute time in the pre-assigned (k+1)-th WCET (14d) comes to be delayed by the execution time (37) of the task (24d) that has interrupted.

Consequently, the (k+1)-th processing ending point (16) comes to include the execution time (37), thereby the power comes to be controlled at the power control check point (6) according to the wrong WCET (14) that is different from the absolute time. The output time (11) also comes to be delayed by the execution time (37). Consequently, the output time saving (11) cannot be assured, thereby the media quality is degraded.

The other problem is an event that if there are many executable tasks (24) that are set in the ready state (33) in the RTOS (23), a jitter occurs in each of those executable tasks (24), thereby both of the processing starting time and the WCET are delayed and no spare time comes to be left, so that the output time cannot be observed. Hereinafter, such an event will be described with reference to FIG. 22.

FIG. 22 shows an illustration for describing how the starting time of a task comes to be delayed just after the task goes into the running state. A task (24a) that is interrupted by another high priority task (24d) and pre-emptied (36) into the ready state and still another task (24c) generated by the task (24a) and set in the ready state (33) are waiting in the ready state (33) respectively so as to occupy the processor (21) as early as possible. However, such low priority tasks (24) as those (24a) and (24c) must wait long in the ready state until they can occupy the processor (21). Usually, the processing of each of such low priority tasks (24a), (24c), etc. is started at the starting time (12) at which the start-up event is received. However, the processing of the task is actually started at a delayed starting time (39) delayed by the ready time (38) and the processing is thus continued just between the delayed starting time (39) and the output time (11). This has been a problem. In addition, the WCET (14) is managed by each application/middleware program. Therefore, if the processing of such an application/middleware program is delayed in starting, the WCET (40) is also delayed by the ready time (38). The final delay WCET (40) thus exceeds the output time (11). This has been another problem. Consequently, the integrated estimation time comes to include an indefinite element, so that the energy-saving effect is lowered.

SUMMARY OF THE INVENTION

The main points of the present invention to be disclosed in this specification will become as follows.

The information processing system of the present invention includes a processor, a hardware timer built in the processor or provided outside the processor, and a clock pulse generator for supplying a clock to the processor and the hardware timer respectively. The hardware timer measures a processing time between starting and ending points of each application task. The application task is divided into a plurality of processings units. The processor compares a time required to process a predetermined one of the plurality of processing units and the worst case execution time of the processing units to change the clock frequency output from the clock pulse generator. The processor, when its computing resource is occupied by another application task during a processing of the current active application task, counts the number of ready state application tasks. If there is any ready state application task other than another application task to be executed, the processor instructs the ready state watching task to raise both of the clock frequency and the source voltage. If there is no such a ready state task, the processor instructs the ready state watching task to lower both of the clock frequency and the source voltage.

Furthermore, the processor, if it comes to know the presence of another ready state application task while starting the above application task, enables the above application task to compare the virtual worst case execution time that is set earlier than the worst case execution time with a time required to process the predetermined processing unit.

Furthermore, the processor should preferably lower both of the clock frequency and the source voltage for executing the current active application task if the difference between the worst case execution time or virtual worst case execution time and the time required to process the predetermined processing unit is greater than the predetermined time and raise both of the clock frequency and the source voltage if the difference is less than the predetermined time as a result of the comparison between the worst case execution time or virtual worst case execution time and the time required to process the predetermined processing unit.

In another aspect, the information processing system of the present invention includes a processor, a timer, a clock generator, and a source voltage regulator. The timer measures the execution time of each application task executed by the processor and each application task is divided into a plurality of processing units. The information processing system manages the number of ready state application tasks. The information processing system, when enabling the processor to execute the first application task, manages the worst case execution time for each of the plurality of processing units if the number of ready state application tasks is less than a predetermined value and manages the virtual worst case execution time that is shorter than the worst case execution time for each of the plurality of processing units if the number of ready state application tasks is greater than the predetermined value. Each of the worst case execution time and the virtual worst case execution time is a time in which a target processing unit should be completed.

According to the present invention, therefore, the power consumption of the subject information processing system can be reduced.

DETAILED DESCRIPTION OF THE PREFERRED EMBODIMENTS

Hereunder, the preferred embodiments of the present invention will be described with reference to the accompanying drawings.

Figure 1:
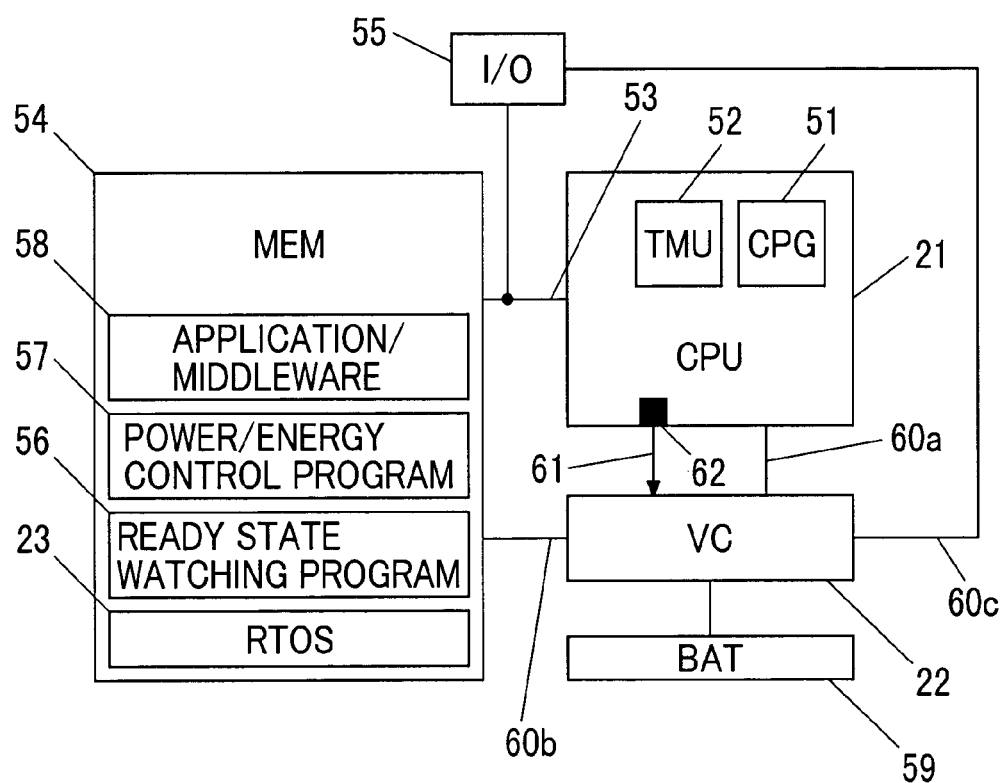
FIG. 1 is a block diagram of an information processing system that is a typical embodiment of the present invention.

FIG. 1 shows a block diagram of a battery-driven information processing system, which is a typical embodiment of the present invention. The apparatus includes a processor built in itself.

The information processing system in this specification includes a clock pulse generator (51) (hereinafter, to be referred to as the CPG) that uses a PLL (Phase Locked Loop) circuit, as well as a processor CPU (21) that includes a timer TMU (52) built in itself. The CPG (51) or TMU (52) may be provided as an external device to realize the present invention. The CPG (51) supplies a clock pulse to the processor (21). The processor (21) uses this clock pulse to synchronize its operation with that of another device. The processor (21) can operate at a desired clock frequency set by the CPG (51). The processor (21) can also send a control signal (57) to a variable DC/DC converter (22) so that the converter (22) supplies a desired source voltage. In addition, the processor (21) is connected to a memory (54), an input device, and an output device (hereinafter, to be referred to as the I/O devices) (55) through a bus (53). The processor (21) operates according to the instruction procedure of the software stored in the memory (54). The software is configured by the RTOS (23) as well as an ready state watching program module (56), a power/energy control program module (57), an application/middleware program module (58), etc.

The variable DC/DC converter (22) converts the voltage of a battery BAT (59) to a source voltage needed by each of such devices as the memory (54), the I/O devices (55), etc. and supplies the source voltage to each of those devices through a power source system (60). The variable DC/bc converter (22) receives a control signal (61) from a port (62) of the processor (21) and controls the processor (21) variably at a source voltage desired by the processor (21). The I/O devices (55) are equivalent to, for example, a display device for displaying both still and motion pictures, a camera for photographing pictures, a microphone for inputting sounds, and a speaker for outputting sounds.

Figure 2:
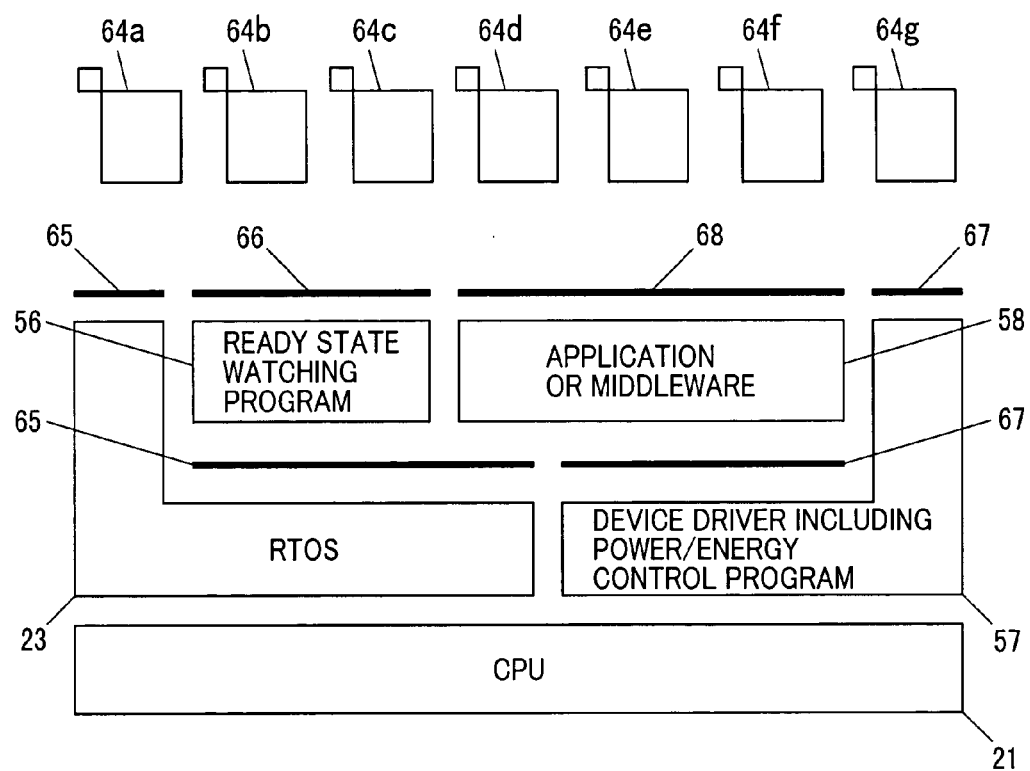
FIG. 2 is an illustration for describing a configuration of the software that realizes the present invention.

FIG. 2 shows an illustration for describing a software configuration for realizing the present invention. The RTOS (23) manages such computing resources as a computing element of the processor CPU (21) and memory resources of the memory (54). In other words, the RTOS (23) specifies a task (64) that is a processing unit referred to as a thread or process started by an external event issued to the processor (21) and/or a timer event issued from the TMU (52) and specifies a memory capacity desired by the task-(64). In addition, the RTOS (23) provides each task with a message communication function for enabling operations to be synchronized/asynchronized among tasks (61). A synchronous operation means an operation in which one task (a) sends information to another task (b) so that a processing to be executed in the processor is passed to the task (b). An asynchronous operation means an operation in which one task (a) sends information to another task (b), but the task (a) occupies the processor to execute the processing; the task (a) passes no processing to another task (b).

The ready state watching program module (56) watches the number of tasks (64) set in the ready state (33) currently in the RTOS (23). Although the ready state watching program module (56) may be replaced with any program module that includes the RTOS (23) that can denote the number of tasks set in the ready state (33) or existence of any of such ready state tasks with a system call or the like, the present invention premises the use of the ready state watching program module (56) here.

The power/energy control program module (57) sends a control program (61) to the variable DC/DC converter (22) through the port (62) so that the processor (21) is set at a desired source voltage. In addition, the module (57) instructs the CPG (51) to be set at a desired clock frequency. For example, if the power/energy control program module (57) controls the object power in two modes (high power mode and low power mode), the module (57) sends a control signal to the variable DC/DC converter (22) in the high power mode so that the CPG (51) is set at a high source voltage and issues an instruction to the CPG (51) so that the CPG (51) is set at a high clock frequency. On the contrary, if the module (57) is in the low power module, the module (57) sends a control signal (61) to the variable DC/DC converter (22) so as to set a low source voltage and issues an instruction to the CPG (51) so as to set a low clock frequency. If the power/energy control program module (57) is provided with a register usable to select a frequency of the CPG (51), the module (57) may write a value in the register without issuing any instruction to the CPG (51).

The application/middleware program module (58) is a desired program to be executed actually in the processor (21). The module (58) is subjected to power control in the present invention.

Each of the RTOS (23), the ready state watching program module (56), the power/energy control program module (57), and the application/middleware program module (58) is provided with a software interface for calling functions, that is, a program function group.

In this specification, the program function group of the RTOS (23) is referred to as a system call (65), the program function group of the ready state watching program module (56) is referred to as a ready watcher interface (hereinafter, to be referred to as the WRI) (66), the program function group of the power/energy control program module (57) is referred to as a power/energy control interface (hereinafter, to be referred to as the PECI) (67), and the program function group of the application/middleware program module (58) is referred to as an application interface (hereinafter, to be referred to as the API) (68) respectively. Each of the RTOS (23) and the power/energy control program module (57) operates the status register, the control register, the internal memory, etc. of the processor (21) directly. The ready state watching program module (56) uses the functions of the RTOS (23) through the system call (65). The RWI (66) provides each task with processings for waiting for messages and sending messages so as to enable communications to be synchronized/asynchronized among tasks. Especially, the message waiting processing enables each task to go into the ready state (32).

The application/middleware program module (58) uses the functions of the RTOS (23) and the power/energy control program module (57) through the system call (65) and the PECI (67). The power/energy control program module (57) is used at each power control check point (6) just after completing the processing of each application slice of the application/middleware program. A task (64) calls the system call (65), the RWI (66), the PECI (67), and the API (68) to execute a desired processing.

In this specification, it is premised that an AV player is used and the processing of the AV player consists of seven tasks (a ready state watching task (64a), an output time management task (64b), a picture output task (64c), a PCM output task (64d), a video decoder task (64e), an audio decoder task (64f), and a sleep task (64g)) so as to simplify the operation of the software of the present invention. The ready state watching task (64a) watches the number of tasks set in the ready state (33) to determine how the system is busy (the number of tasks, each of which must be processed immediately upon receiving a start instruction). The output time management task (64b) displays/outputs pictures on a display unit/from a speaker with use of the picture display task (64c) and the PCM output task (64d), manages an output time (deadline) at which voice data must be output, enables the RTOS (23) watch the output time, and instructs the RTOS to issue a start-up event to the picture output task (64c) or PCM output task (64d) when the output time is reached. The picture output task (64c) displays pictures on a display unit or the like and the PCM output task (64d) outputs voices and sounds from a speaker or the like. In addition, the video decoder task (64e) decompresses compressed data related to such pictures as MPEG. The audio decoder task (64f) decompresses compressed data related to such voices/sounds as MP3 data. The sleep task (64g) enables the whole system that is in the ready state to go into the sleep state.

Priority is set for each of the ready state watching task (64a), the output time management task (64b), the PCM output task (64d), the picture output task (64c), the audio decoder task (64f), the video decoder task (64e), and the sleep task (64g) in order.

Messages (71) are used for synchronous/asynchronous communications among tasks. The ready state watching program module (56) provides each task with a message (71) memory block in a memory (54) area of the RTOS (23) according to the predefined memory format.

Figure 3:
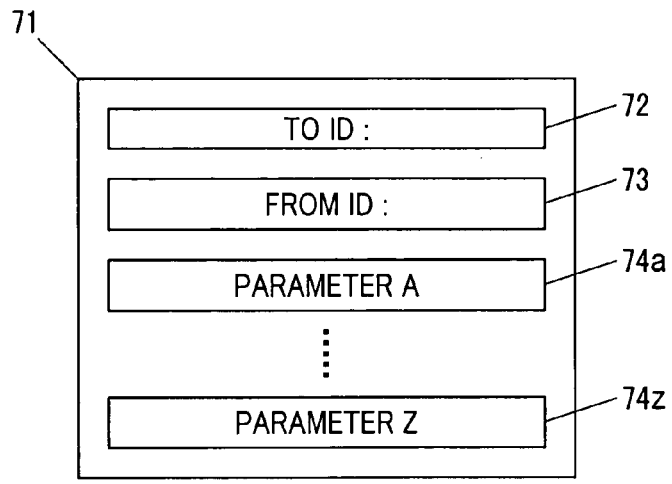
FIG. 3 is a message format.

FIG. 3 shows a message format. The message format includes contents of a destination address TO-ID (72) equivalent to the ID of a receiving task, a source address FR-ID (73) equivalent to the ID of a sending task, and a content to send (74). Each task writes the message contents in the memory block equivalent to the message (71) according to the message format to execute a desired processing. Then, the task (64) sends/receives messages (71) to execute the desired processing.

Figure 4:
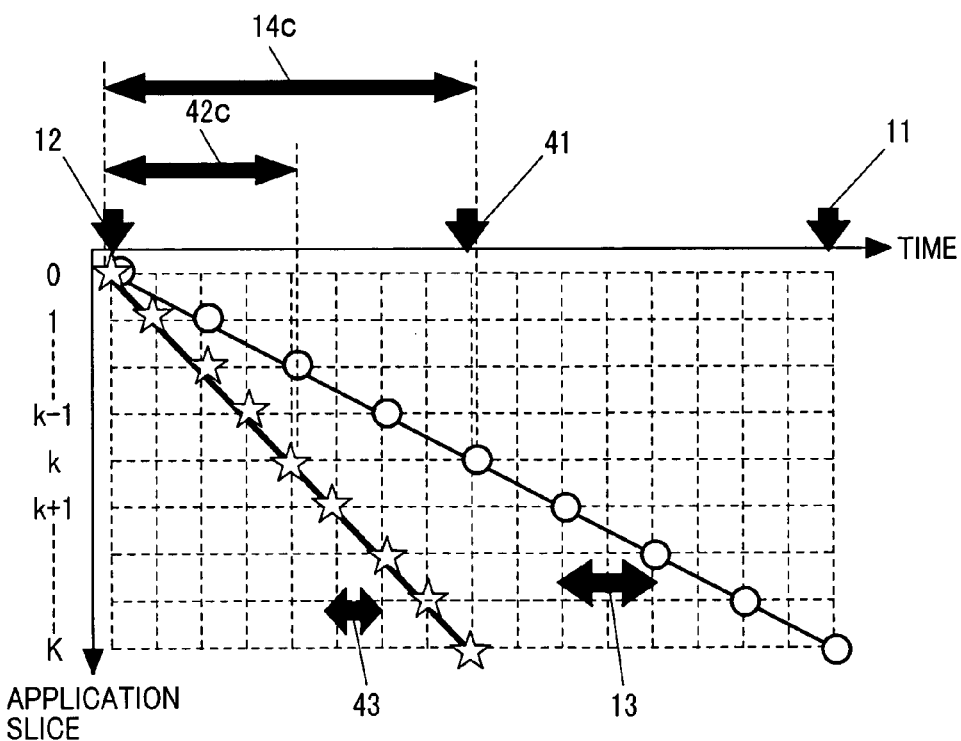
FIG. 4 is a concept chart of the present invention.

Next, a description will be made for how to control a power in response to a multi-task processing of the present invention. FIG. 4 is a concept chart of the present invention. In order to simplify the description, it is premised that there are two modes that are a high power mode and a low power mode. At first, a virtual output time (41) is set, then a virtual worst case output time (hereinafter, to be referred to as the virtual WCET) (42) is set. The virtual output time (41) is shorter than the output time (11). In this case, the virtual output time (41) is preset as a half of the output time (11) and the virtual WCET (42) is set using the linear programming method. The virtual WCET becomes a half time of the WCET (14) for the same application slice (4) and the virtual sub-output time (43) also becomes a half time of the sub-output time (13).

The RTOS (23) or ready state watching task (64e) counts the number of tasks (24) set in the ready state (33). If it is found that all the tasks (24) are sleep tasks (64g) and no task is set in the ready state (33) as a result of the watching of the tasks set in the ready state by the RTOS (23) or top priority ready state task (64e), a low source voltage and a low clock frequency are used. This is why the power consumption of the information processing system is reduced. If any task can be set in the sleep state, the sleep task (64g) is executed to set the task into the sleep state.

On the other hand, if there is one task set in the ready state (33) except for sleep tasks (64g), the low power mode is set to reduce the power consumption. If there are two or more tasks set in the ready state (33), the processing of the current active task is ended quickly so as to set the high power mode so that the processing control is passed to the task set in the ready state (33) as early as possible.

At first, the current active task (24) inquires whether or not there is any task set currently in the ready state (33) from the RTOS (23) or ready state watching task (24e) at each power control check point (6). If any task (24) is set in the ready state (33), it is determined whether or not the processing of the task (24) is in time by making a comparison with the virtual WCET (42). If no task (24) is set in the ready state, it is determined whether or not the processing of the task (24) is in time for the output time by making a comparison with the WCET (14) to control the object power. In other words, if the processing of the task (24) is not in time for the output time, the system goes into the high power mode. If it is in time for the output time, the system goes into the low power mode. This is to end the processing of the current task (24) and pass the processing control to the task set in the ready state (33). By making a comparison with the virtual WCET when any task is set in the ready state (33) as described above, the current active task can be ended earlier and the CPU is given up to another task set in the ready state (33).

Although both WCET and virtual WCET are set so as to be in time for the output time respectively in this embodiment, the method is not limited only to that, of course. For example, both WCET and virtual WCET may be set earlier than the actual output time. In such a case, it is possible to obtain time to spare up to the actual output time, thereby the reliability of quality control is improved.

Next, an application slice will be described with reference to FIG. 5. A task (24) executes processings between the starting and ending points (1) and (3) of an application program with an initialization processing (2) therebetween. The initialization processing (2) secures/initializes a memory area used for application, middleware, device driver programs, etc. and executes necessary pre-processings, such as setting of values for the source voltage, the clock frequency, each register, etc. to run the subject application program in the processor (21).

Application and middleware programs used to execute multimedia processings often repeat the same processing. A unit of repeating the same processing such way is referred to as an application slice (4). Each of the values set in the application slices (4a) to (4e) shown in FIG. 5 denotes the number of processings to be repeated. The values are stored in an application slice execution manager (7) provided in each application/middleware program sequentially.

In a repeating check processing (5), the number of processings to be repeated for an application slice (4) is checked. The processing of the application program ends at the application ending point (3) when all the application slices are processed.

Figure 6:
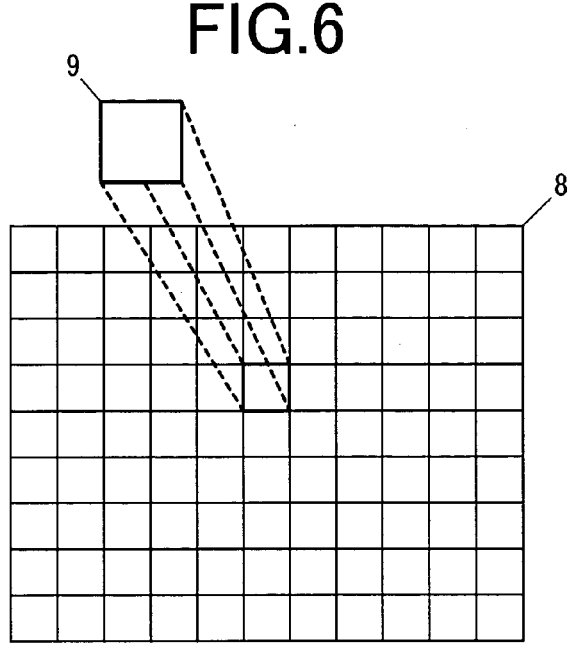
FIG. 6 is a concept chart for describing application slices of an MPEG-4 video decoder program.

FIG. 6 shows an illustration for describing application slices of an MPEG-4 video decoder program. For example, if an MPEG-4 video decoder processing is executed in a picture format (8) (referred to as QCIF) consisting of 144 pixels arranged vertically and 176 pixels arranged horizontally, the MPEG-4 video decoder program decodes the picture format (8) to a picture of each pixel block (referred to as a macro-block (9)) consisting of 16 pixels arranged vertically and 16 pixels arranged horizontally. Consequently, the application slice processing of the MPEG-4 video decoder program comes to be equivalent to a picture decoding processing for each macro block. And, the number of processings repeated for the application slice (4) becomes 99 times that is the same as the number of macro blocks in the QCIF picture format (8). The repeating check processing (5) thus checks 99 times for whether or not an application slice processing is done.

The picture format (8) may consists of 96 pixels arranged vertically and 144 pixels arranged horizontally. This picture format (8) is referred to as the sub-QCIF picture format. If this sub-QCIF picture format (8) is used, the number of macro blocks becomes 48. The number of application slices thus becomes 48.

The number of processings to be repeated for the application slice (4) in the MP3 decoder program is equivalent to the number of channels. The number of processings to be repeated for a stereo play-back processing is twice. In other words, the MP3 decoder program, when in a voice/sound decoding processing, repeats the same decoder processing for each channel and the number of processings to be repeated such way is assumed as an application slice (4).

Figure 7:
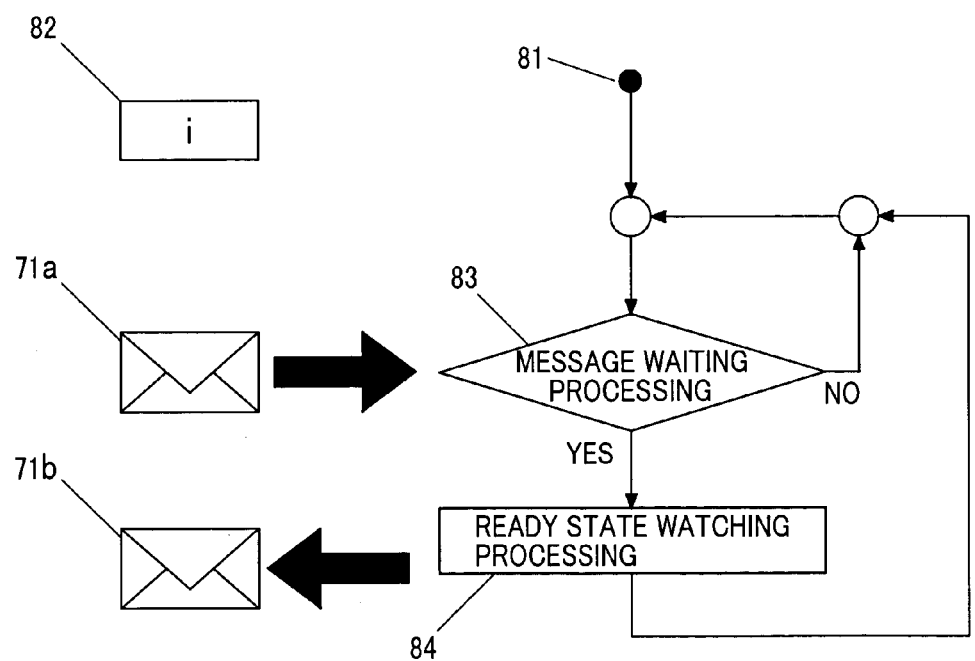
FIG. 7 is a flowchart of the operation of a ready state watching task.

FIG. 7 shows a flowchart of the operation of a ready state watching task. A ready state watching task (64a) generated at a system call (65) supplied from the RTOS (23) initializes the ready state watching variable (82) to 0 in the initial state (81), then calls the message waiting processing (83) from the RWI (66).

The message waiting processing (83) checks whether or not a message (71a) that is a given start-up event to the ready state watching task (64a) is received. If the check result is YES (received), the system executes a ready state watching processing (84) requested by the task (64a). If not, the system keeps the task (64a) waiting for the message (71a).

Figure 8:
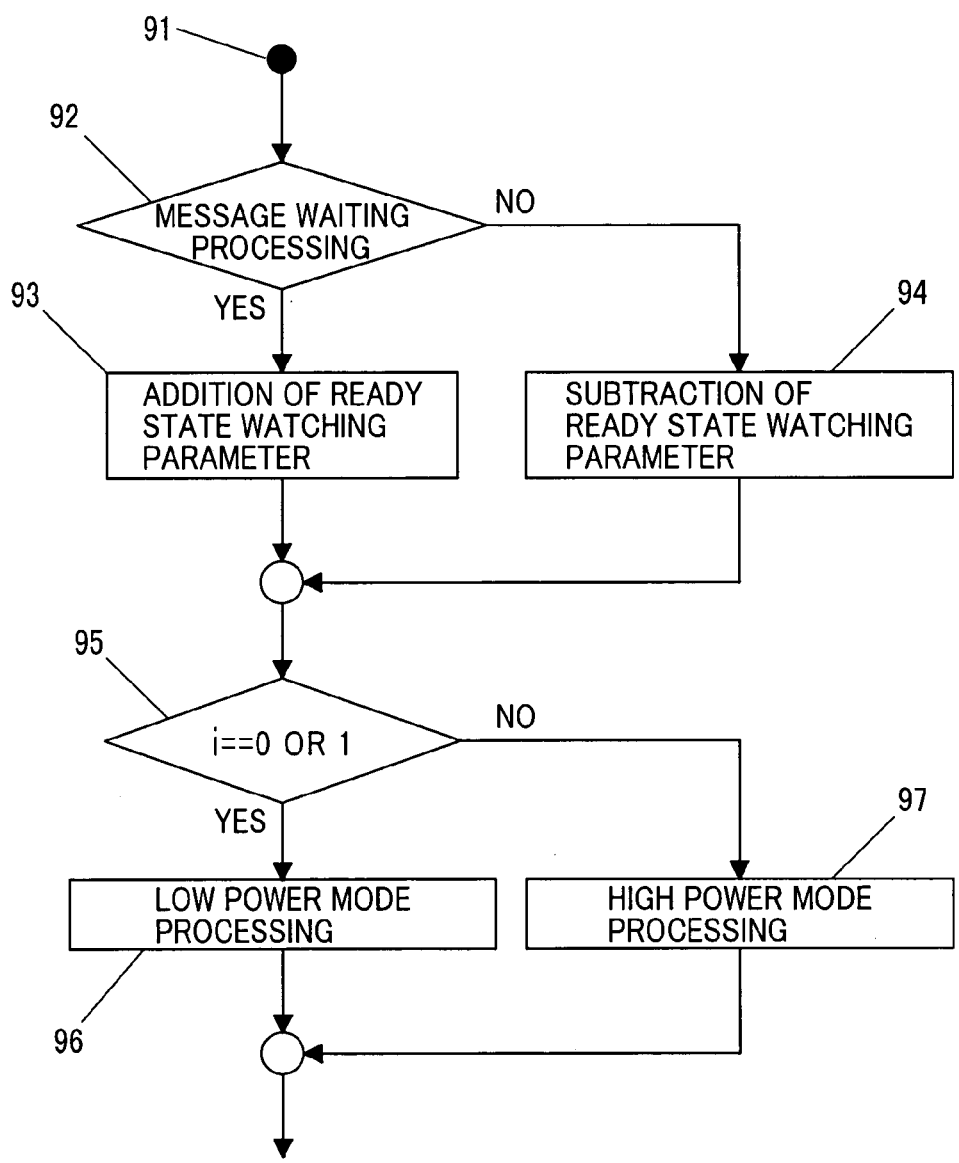
FIG. 8 is another flowchart of the operation of a ready state watching processing.

FIG. 8 shows a flowchart of the ready-state watching processing (84). The ready state watching processing (84) is started at a ready state watching starting point (91) to execute the message check processing (92) of the message (71*a*) sent to the ready state watching task (64*a*).

The message check processing (92) checks whether the received message (71*a*) is a ready state transition message or waiting state transition message.

In the ready state transition message, "1" that denotes ready state transition is written in the content field (74*a*) of the parameter A in the message format shown in FIG. 8. In the waiting state transition message, "0" that denotes waiting state transition is written in the content field (74*a*). Such values to be written are predetermined.

Consequently, the system checks the content field (74*a*) of the parameter A in the received message (71*a*) for whether "1" or "0" is written therein. If "1" is written, the system executes addition of ready state watching parameter (93). If "0" is written, the system executes subtraction of ready state watching parameter (94). In the addition of ready state watching parameter, the system adds 1 to the value in the ready state watching variable (82). The system then sends the message (71*a*) again to the destination address (72) if the address is written. If not written, the system discards the received message (71*a*), that is, returns the message (71*a*) to the memory. In the subtraction of ready state watching parameter, the system subtracts 1 from the value in the ready state watching variable (82) and discards the received message (71*a*), that is, returns the message (71*a*) to the memory.

After that, the system executes a ready state watching variable check processing (95). If "0" or "1" is written in the ready state watching variable (82), the system calls the low power mode processing (96) from the PECI (67). The processing (96) uses the functions of the power/energy control program module (57). Otherwise, the system calls the high power mode processing (97).

Figure 9:
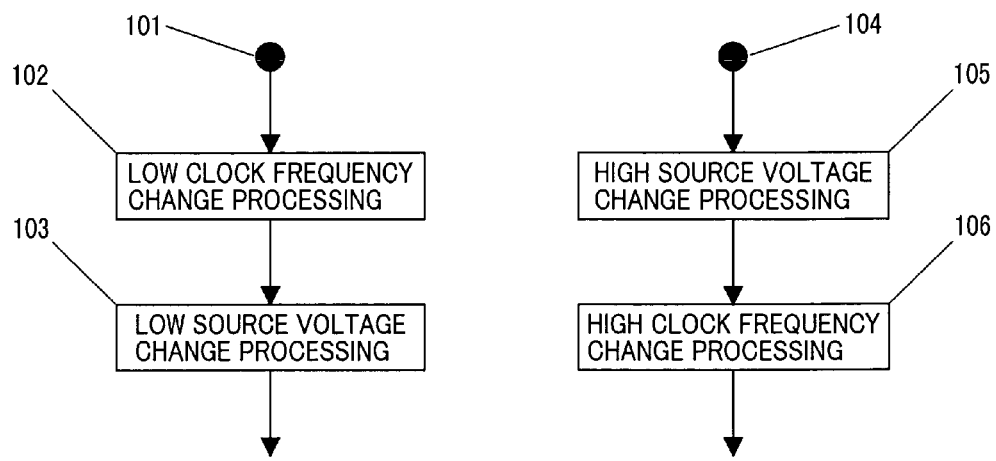
FIG. 9 is flowcharts of the operations of a low power mode processing and a high power mode processing.

FIG. 9 shows flowcharts of both low power mode processing and high power mode processing. The low power mode processing (96) is started at a low power mode processing starting point (101). The processing (96) consists of a low clock frequency change processing (102) and a low source voltage change processing (103) that are executed in order. The low clock frequency change processing (102) changes the clock pulse generated from the CPG (51) so as to set a lower clock frequency to be supplied to the processor (21). In the low source voltage change processing (103), the processor (21) sends a control signal (61) for lowering the source voltage to be supplied to itself to the variable DC/DC converter (22). Receiving the control signal (61), the converter (22) lowers the source voltage.

The high power mode processing (97) is started at a high power mode processing starting point (104). The processing (97) consists of a high clock frequency change processing (105) and a high source voltage change processing (106) that are executed in order. In the high clock frequency change processing (105), the processor (21) sends a control signal (61) for raising the source voltage to be supplied to itself to the variable DC/DC converter (22). Receiving the control signal (61), the converter (22) raises the source voltage. In the high clock frequency change processing (106), the system changes the clock pulse generated from the CPG (51) so as to set a higher clock frequency to be supplied to the processor (21).

Figure 10:
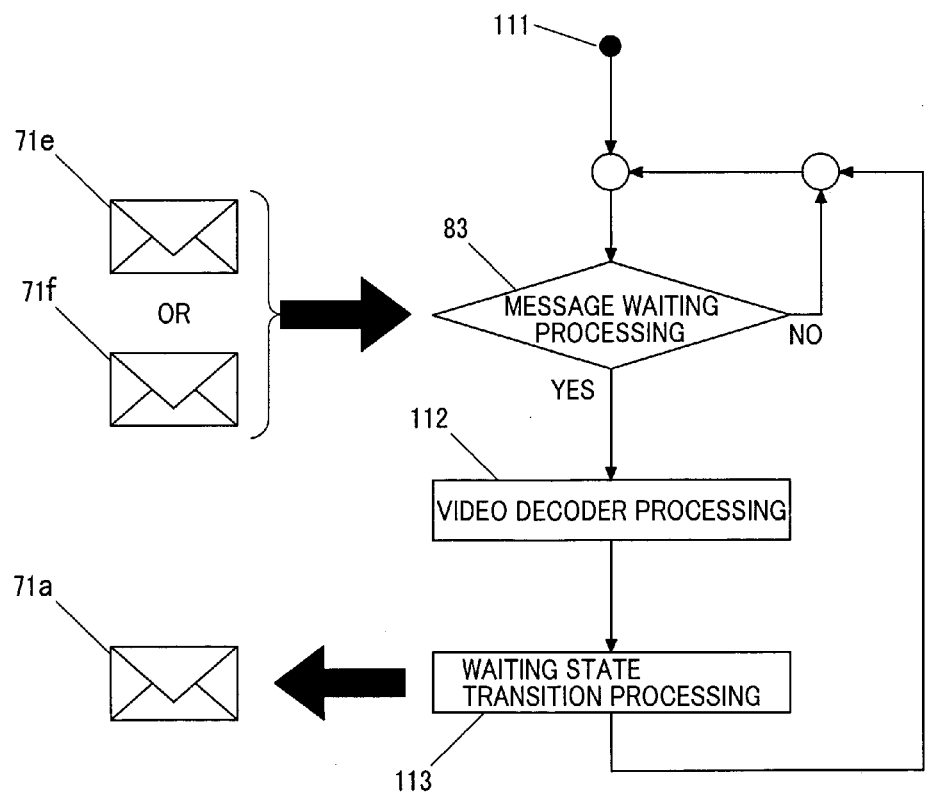
FIG. 10 is flowcharts of the operations of a video decoder task and an audio decoder task.

FIG. 10 shows flowcharts of the operations of a video decoder task and an audio decoder task. The video decoder task (64*e*) generated by a system call supplied from the RTOS (23) starts its operation at a video decoder initialization starting point (111) and calls a message waiting processing (83) from the RWI (66).

The message waiting processing (83) checks whether or not a message (71*e*) that is a start-up event for the video decoder task (64*e*) is received. If the check result is YES (received), the system executes a video decoding processing (112*e*). If not, the system shifts the video decoder task (64*e*) into the waiting state (32), thereby the task (64*e*) waits for receiving the message (71*e*).

Figure 5:
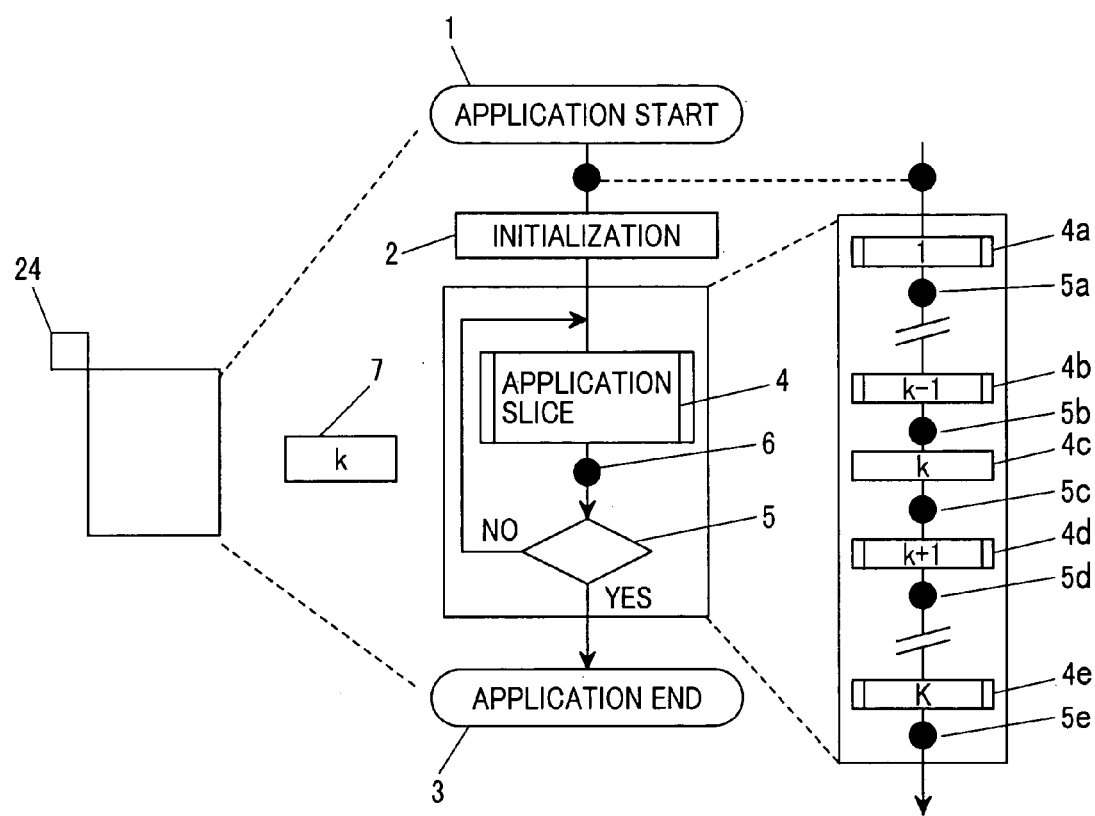
FIG. 5 is a concept chart of application slices.

The video decoding processing (112*e*) repeats the processing (5) of an application slice for each macro block shown in FIGS. 4 through 6 to control the power at each power control check point (6). After the video decoding processing (112*e*), the system calls a waiting state transition processing (113) from the RWI (66). In the waiting state transition processing (113), the system sends a waiting state transition message (71*a*) to the ready state watching task (64*a*) to report the end of the video decoding processing (113) and finally shifts the video decoder task (64*e*) into the waiting state (32).

The audio decoder task (64*c*) generated by a system call (65) received from the RTOS (23) executes an audio decoding processing (112*f*) that is the same as the video decoding processing (112*e*) except that video data is replaced with audio data in the processing (112*f*). Consequently, the system repeats the same processing for an application slice (4) with respect to each stereo or channel processing. After the processing (5), the system controls the power at each power control check point (6).

Figure 11:
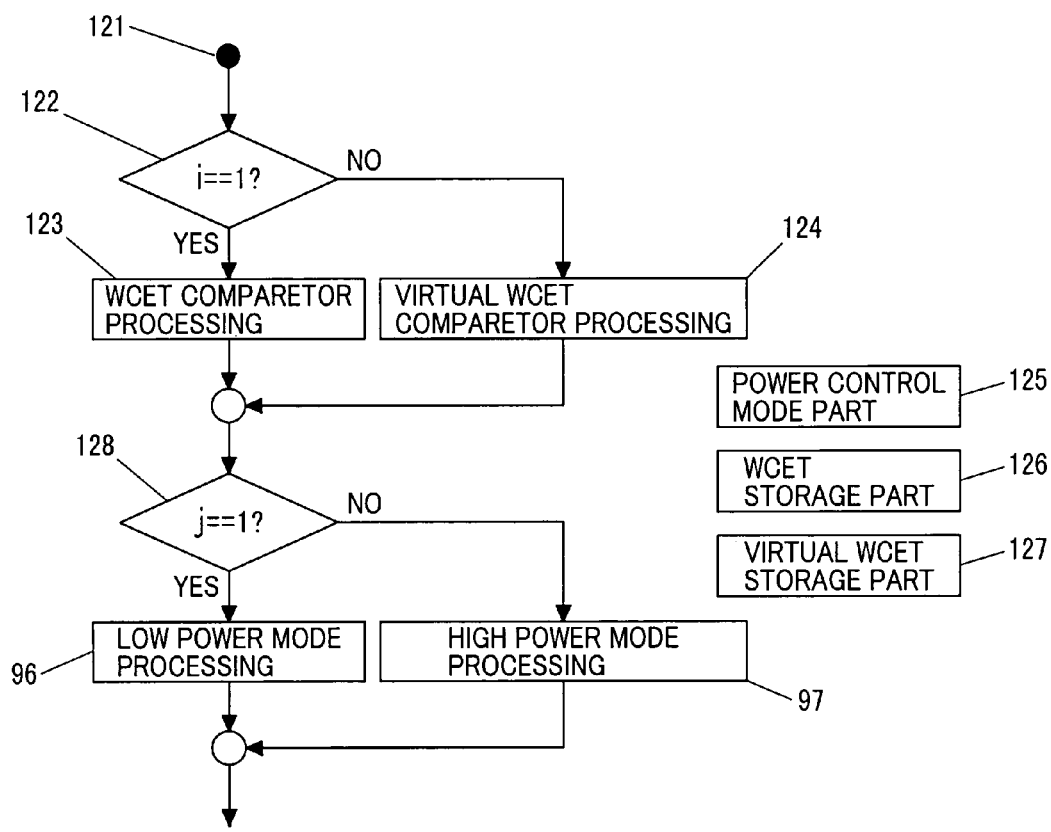
FIG. 11 is a flowchart of both video and audio decoder tasks.

FIG. 11 is a flowchart of a power control algorithm executed in a task. In this specification, application slices are set in the video decoding processing (112*e*) and the audio decoding processing (112*f*) respectively. Power control algorithm software is embedded in the power control check point (6).

The audio decoder task (64*c*) starts its processing at a power control starting point (121) set in itself and executes a check processing (122) for the ready state watching variable (82). In the processing (122), the system checks the value written in the ready state watching variable (82), that is, whether or not the written value is "1". If the value is "1", the system executes a WCET comparison processing (123). Otherwise, the system executes a virtual WCET comparison processing (124). In the WCET comparison processing (123), for example, the time difference obtained by subtracting the integrated time (15) between the starting time (12) of the video decoder task (64*e*) or audio decoder task (64*f*) and the k-th processing ending point (16) of the application slice (4*c*) from the WCET (14*d*) of the (k+1)-th processing of the application slice (4*d*) is compared with the time difference between the WCET (14*d*) of the (k+1)-th processing of the application slice (4*d*) and the WCET (14*c*) of the k-th processing of the application slice (4*c*), that is, a time value obtained by multiplying the sub-output time (13) between the k-th processing and the (k+1)-th processing by a multiple of the high clock frequency. The TMU (52) is used to count the integrated time (15).

If the value obtained by subtracting the integrated execution time (15) from the WCET (14*d*) is greater than the time value obtained by multiplying the WCET (14*d*) by the above multiple, the system writes "1" in the power control mode part (125) managed in the power/energy control program module (57). On the contrary, if the value is less than the time value, the system writes "0" therein. In addition, the system adds the value of the sub-output time (13) to the value in the WCET storage part (126) managed in the application/middleware program module (58). The WCET (14) is identical to the value set in the WCET storage part (126). The value in the WCET storage part (126) is assumed to be identical to the sub-output time (13) when in the initialization processing (2).

On the other hand, in the virtual WCET comparison processing (124), just like the WCET comparison processing, for example, the time difference obtained by subtracting the integrated time (15) between the starting time (12) of the video decoder task (64e) or audio decoder task (64f) and the k-th processing ending point (16) of the application slice (4c) from the virtual WCET (42d) of the (k+1)-th processing of the application slice (4d) is compared with the time difference between the virtual WCET (42d) of the (k+1)-th processing of the application slice (4d) and the virtual WCET (42c) of the k-th processing of the application slice (4c), that is, a time value obtained by multiplying the virtual sub-output time (13) between the k-th processing and the (K+1)-th processing by a multiple of the high clock frequency. The TMU (52) is also used to count the integrated time (15) in that case.

If the value obtained by subtracting the integrated execution time (15) from the virtual WCET (43d) is greater than the time value obtained by multiplying the virtual WCET (43d) by the above multiple, the system writes "1" in the power control mode part (125) managed in the power/energy control program module (57). On the contrary, if the value is less than the time value, the system writes "0" therein. In addition, the system adds the value of the virtual sub-output time (13) to the value in the virtual WCET storage part (127) managed in the application/middleware program module (58). The virtual WCET (42) is identical to the value stored in the virtual WCET storage part (127). The value in the virtual WCET storage part (127) is identical to the virtual sub-output time (43) when in the initialization processing (2).

In the power control mode check processing (128), the system checks the power control mode part (125) for the set value. If "1" is set in the mode part (125), the system goes to the low power mode processing (96). If "0" is set there, the system goes to the high power mode processing (97).

Figure 12:
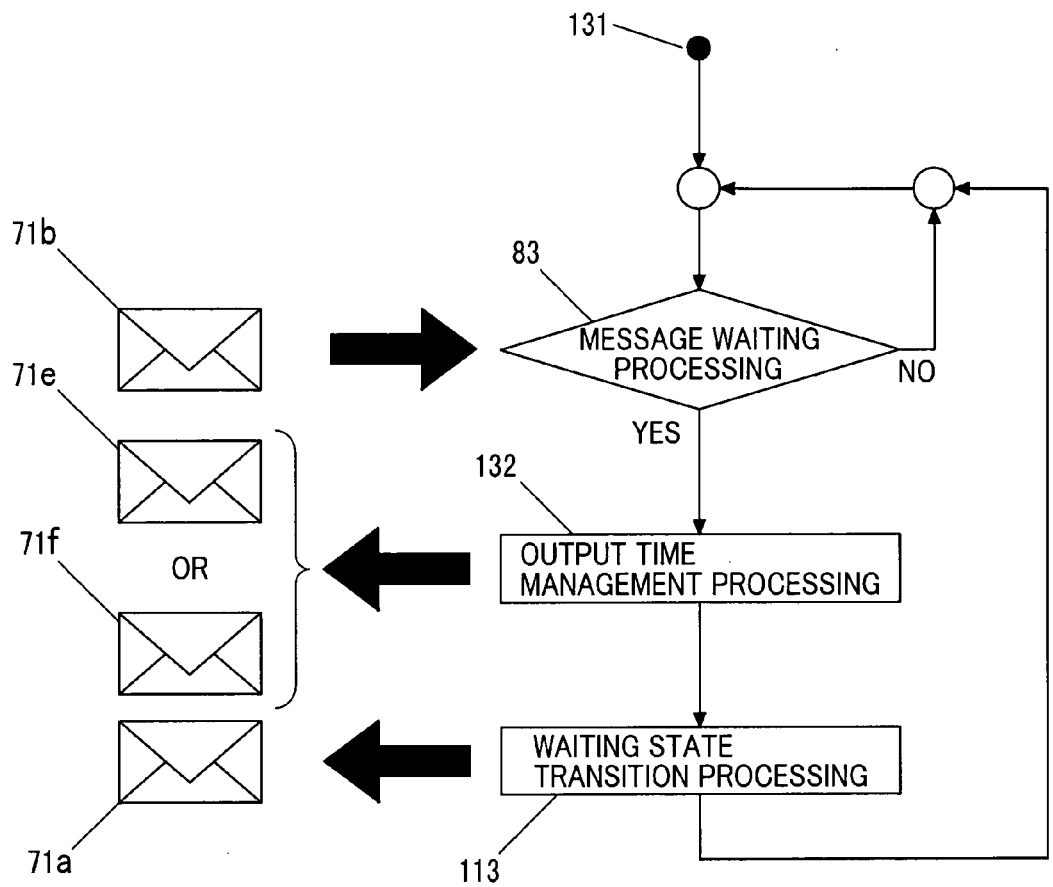
FIG. 12 is a flowchart of the operation of an output time management task.

FIG. 12 shows a flowchart of the operation of the output time management task (64b). The task (64b) starts its processing at the output time management starting point (131). The task (64b) sends a message (71b) that is a start-up event to itself at the time of initialization processing again.

In the message waiting processing (83), the system checks whether or not the output time management task (64b) receives a message (71b) that is a start-up event. If the check result is YES (received), the system executes an output time management processing (132). If the check result is NO, the system shifts the task (64b) into the waiting state (32) until the task (64b) receives the message (71b).

In the output time management processing (132b), the system enables the RTOS (23) to recognize a video output time or audio output time of one frame respectively beforehand. Then, the system calls a waiting state transition processing (113) from the RWI (66). When the waiting state transition processing (113) is called, the output time management task (64b) goes into the waiting state (32).

When the video output time or audio output time is reached, the RTOS (23) sends a message (71c) that is a start-up timer event to the picture output task (64c) or a message (71d) to the PCM output task (64d).

The flowcharts of the picture output task (64c) and the PCM output task (64d) are the same as the flowchart of the output time management task (64b) shown in FIG. 12. However, the output time management processing (132b) becomes a picture display processing (132c) in the picture output task (64c) and a PCM output processing (132d) in the PCM output task (64d). In addition, the output time management task (64b) sends a message (71b) to itself at the time of initialization at the output time management starting point (131b) while no message (71) is sent at any of the picture display starting point (131c) and the PCM output starting point (131d).

In the picture display processing (132c), the system displays a picture processed by the video decoder task (64e) on a display screen. The system then sends a ready state change message (71e) that describes the destination address (72) of the video decoder task (64e) to the ready state watching task (64a), then instructs the ready state watching task (64a) to send the received ready state transition message (71e) to the video decoder task (64e).

In the PCM output processing (132d), the system outputs the PCM signal processed by the audio decoder task (64f) from a speaker (64f). The system then sends the ready state transition message (71f) that describes the address of the audio decoder task (64f) to the ready state watching task (64a), then instructs the ready state watching task (64a) to send the received ready state transition message (71f) to the audio decoder task (64f).

Figure 13:
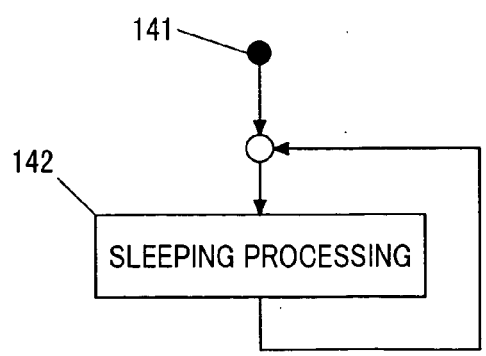
FIG. 13 is a flowchart of the operation of a sleep task.

FIG. 13 shows a flowchart of the operation of the sleep task (64g) The sleep task (64g), which is started up at the sleep task starting point (141), executes a sleep processing (142). In the sleep processing (142), the task (64g) sets a value in the CPG (51) so as to stop the clock pulse supplied to the processor (21). The processor (21) thus stops. The sleep task is the lowest in priority, so that the processor stops after all the tasks except for the sleep task (64g) go into the waiting state, that is, the idle state. Each of those tasks goes out of the idle state and goes into a normal operation state upon receiving an interruption from the TMU (52) or I/O device (55).

If the information processing system is configured as described above, the active task is prevented from processing delay even when it is interrupted by an interruption/exceptional processing, thereby the system power is optimized effectively.

Figure 14:
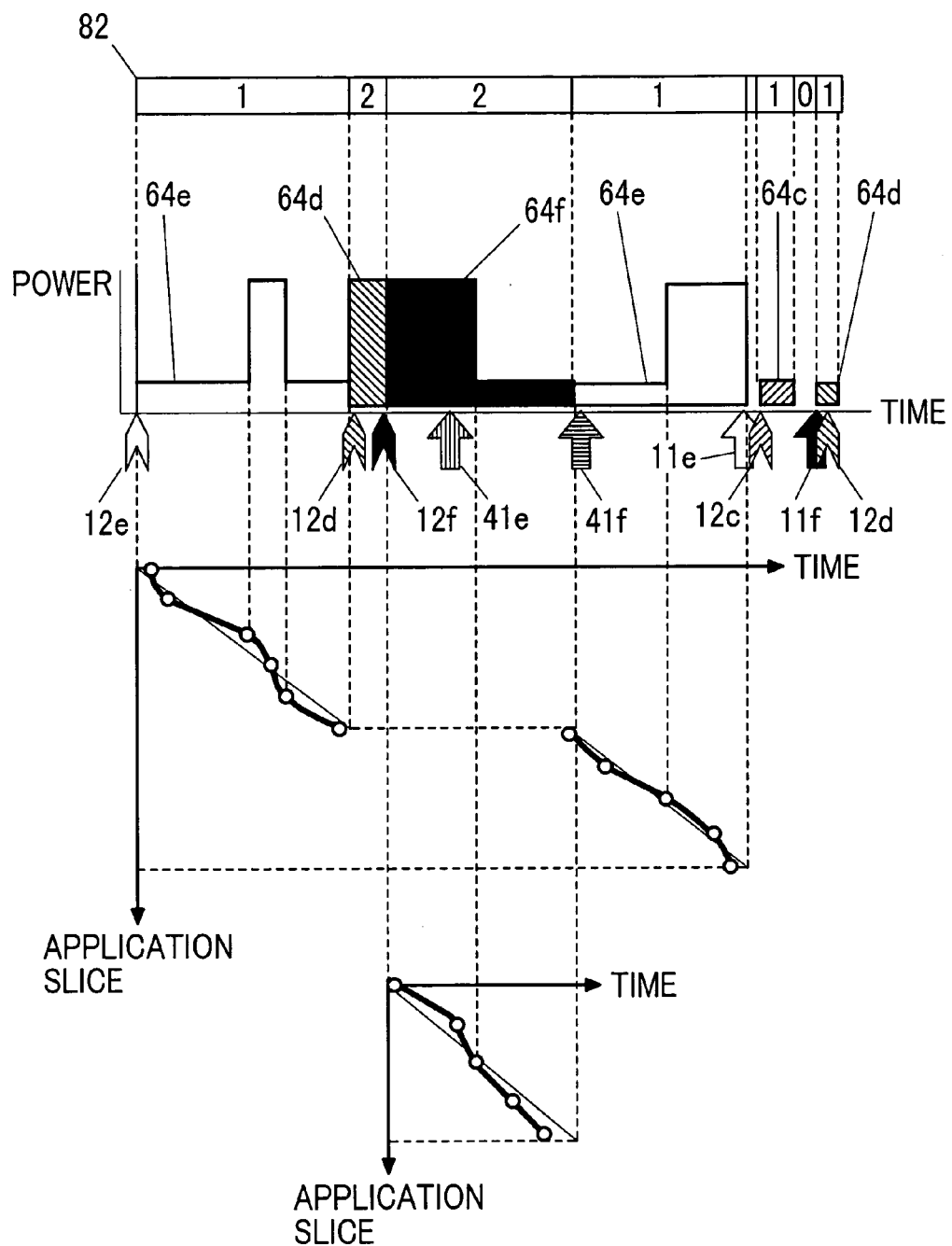
FIG. 14 is an illustration for describing the power controlling by the information processing system of the present invention.

FIG. 14 shows a chart for describing an example of the power control of the information processing system of the present invention. The vertical axis denotes the power consumption of each task (64) and the horizontal axis denotes the eclipsed time of each task. The area of each task is equivalent to the energy consumption of the task.

For example, the video decoder task (64e) is started up at the task starting time (12e) and continued up to the output time, which is the deadline of the processing of the video decoder task (64e). In that connection, the ready state watching task (64a) sets "1" in the ready state watching variable (82) and a low power as the power of the information processing system at the task starting time (12e) in the initialization processing (2). The system controls the power in the processing of each application slice (4) until the processing of the video decoder task (64e) ends. For example, when the processing of the third application slice ends, the system goes into the high power mode, since the processing is found to be delayed from the WCET.

When the starting time (12d) of the preset PCM output task (64d) is reached, the PCM output task (64d) set for high priority is started up. And, 1 is added to the value in the ready state watching variable (82), thereby the value in the variable (82) becomes 2. And, because the value in the variable (82) is 2, the ready state watching task (64a) shifts the information processing system into the high power mode. The video decoder task is then pre-empted (36) and set in the ready state (33). The PCM output task (64d) goes into the running state (31) to output audio PCM signals from a speaker. The PCM signals are generated beforehand in a decoding processing. When the output ends, the system sends a message (71f) to the audio decoder task (64f), thereby the audio decoder task (64f) goes into the ready state, then 1 is added to the value in the ready state watching variable (82) (not shown), thereby the value in the variable (82) becomes 3.

The PCM output task (64d) sends a message (71a) to the ready state watching task (64a) just before ending the processing, then subtracts 1 from the value in the ready state watching variable (82). The value in the variable (82) thus becomes 2.

The audio decoder task (64f) is started up at the starting time (12f). However, because the value in the ready state watching variable is 2, the power of the information processing system is kept in the high power mode when the audio decoder task (64f) is started up.

And, because the value in the ready state watching variable (82) is 2, the audio decoder task (64f) controls the power when in processing of each application slice (4) so as to be in time for the virtual output time of the audio decoder task (64f), not in time for the output time (11f) thereof. The audio decoder task (64f) sends a message (71a) to the ready state watching task (64a) just before ending its processing, then subtracts 1 from the value in the ready state watching variable (82). The value in the variable (82) thus becomes 1.

When the audio decoder processing (64f) ends, the video decoder processing (64e) that has been pre-emptied (36) in the ready state is restored into the running state (31) to restart the suspended processing. And, because "1" is set in the ready state watching variable (82) at that time, the ready state watching task (64a) sets the low power mode for the information processing system.

The video decoder processing task (64e) controls the power when in processing of each application slice so as to be in time for the output time (11e), not in time for the virtual output time of the video decoder processing task (64e), since 1 is set in the ready state watching variable (82).

When the video decoder processing task (64e) ends at its output time (lie), the task (64e) sends a message to the ready state watching task (64a) just before ending its processing, then subtracts 1 from the value in the ready state watching variable (82). The value in the variable (82) thus becomes 0.

And, because "0" is written in the ready state watching variable (82), the ready state watching task (64a) sets the low power mode for the information processing system.

When the preset starting time (12c) of the picture output task (64c) is reached, the picture output task (64c) is started and 1 is added to the value in the ready state watching variable (82), thereby the value in the variable (82) becomes 1. And, because 1 is written in the ready state watching variable (82), the task (64a) keeps the apparatus in the low power mode as is.

The picture output task (64c) sends a message (71a) to the ready state watching task (64a) after displaying the picture on the display screen, then subtracts 1 from the value in the ready state watching variable (82). The value in the variable (82) thus becomes 0.

When the output time (11f) of the audio processing task (64f) goes by and the starting time (12d) of the preset PCM output task (64d) is reached, 1 is added to the value in the ready state watching variable (82). The value in the variable (82) thus becomes 1.

Due to the controlling effects described above, the switching timing of controlling between source voltage and clock frequency is optimized. And, as it is well known generally, power consumption is proportional to the product of a squared source voltage and a clock frequency. For example, if the power is to be controlled in two power modes according to two combinations of the source voltage and the clock frequency, for example, one of the source voltage and clock frequency combination is 1.25[V] and 60 [MHz] and the other is 1.5[V] and 120 [MHz], the source voltage rate becomes 0.83 and the clock frequency rate becomes 0.5. Therefore, the power consumption is reduced by about 65% more than the power consumption when the operation is continued at 1.5[V] and 120 [MHz]. And, the energy consumption is proportional to the product of a squared source voltage and an execution cycle at a low source voltage. If the execution cycle ratio between the low source voltage control and the high source voltage control is between 50% to 90%, the energy consumption is reduced by about 15% to 25% more than the energy consumption when the operation is continued at 1.5[V] and 120 [MHz].

Figure 15:
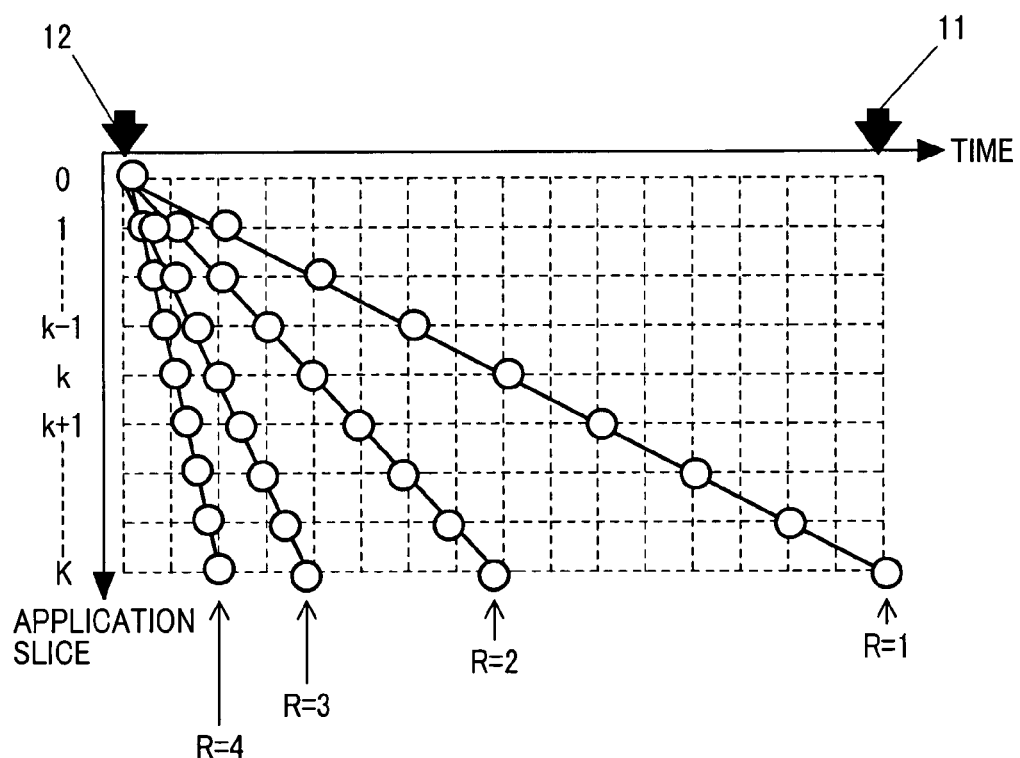
FIG. 15 is a concept chart for describing the second embodiment of the present invention.

FIG. 15 shows a concept chart of the second embodiment of the present invention. In FIG. 15, there is only a difference from FIG. 4; the difference is that a plurality of virtual WCETs (42) are provided in FIG. 15. In the first embodiment, whether to use the WCET (14) or virtual WCET (42) is decided by whether or not there is any task (24) set in the ready state (33) in order to simplify the description. In this second embodiment, however, when there are many tasks (24) set in the ready state (33), a plurality of virtual WCETs are provided so as to complete processings of those tasks as quickly as possible. For example, if there are three ready state tasks (R=3), the WCET is compared with the third virtual WCET from the right. Because a plurality of virtual WCETs (42) are provided and selection is made in accordance with the number of ready state tasks such way, the power is controlled more accurately. In addition, existence of such many ready state tasks (24) means existence of many tasks (24) that must be processed by the processor (21). And, in this embodiment, the more the number of tasks that must be processed by the processor (21) increases, the more quickly the power control system in this second embodiment can complete task processings.

Figure 16:
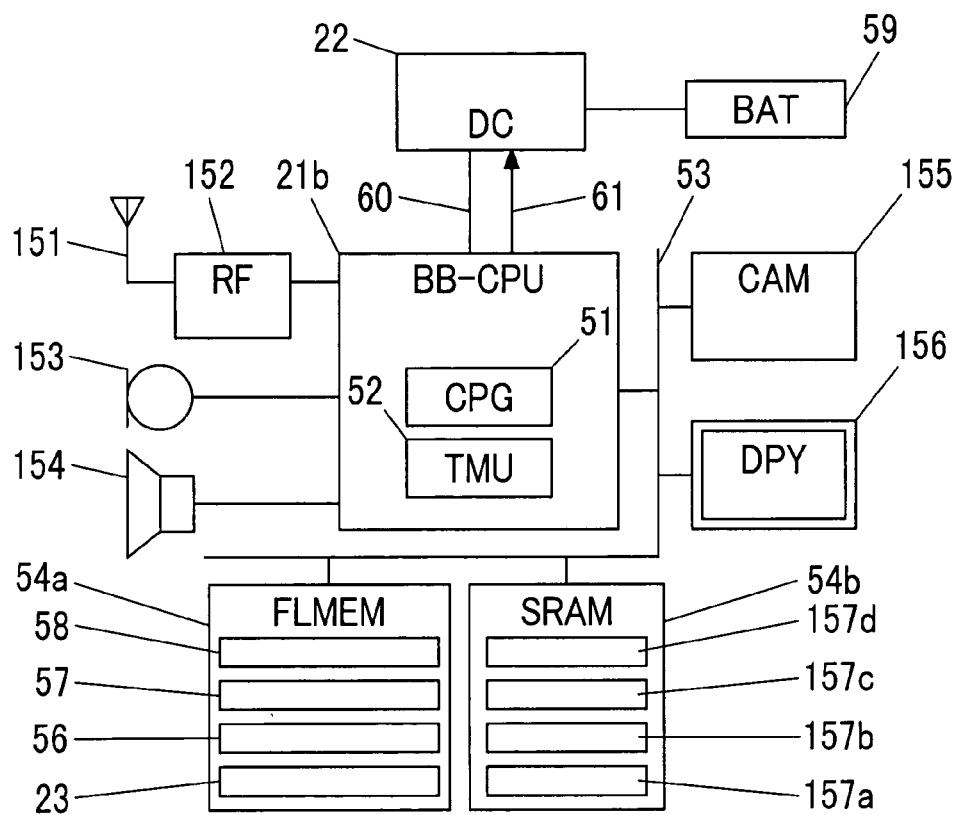
FIG. 16 is an information processing system that uses one processor in an embodiment of the present invention.

FIG. 16 shows an information processing system that uses one processor in an embodiment of the present invention. In this embodiment, the information processing system is assumed to be used for a portable telephone that uses one processor.

The processor CPU (21) shown in FIG. 1 is equivalent to a base band processor BB-CPU (21b) shown in FIG. 16. The base band processor (21b) is mainly used for digital communication processings and communication protocol processings. When the processor BB-CPU (21b) is not used for any of such communication processings, however, it is used for application processings. The terminals of the base band processor (21b) are connected directly to analog radio communication circuit (hereinafter, to be referred to as the RF) connected to an antenna (151), a microphone (153) for voice communications, a speaker (154) for reproducing voice communication and music signals, and a bus (53).

The I/O device (55) shown in FIG. 1 is equivalent to a CCD camera CAM (155), a liquid crystal display, or organic EL display DPY (156) shown in FIG. 16.

A memory (54) may be any of a non-volatile memory FLMEM (54a) represented by the flash memory and a volatile memory SRAM (54b) represented by the SRAM.

The non-volatile memory (54a) stores program data such as bodies of program instructions and such static programs as fixed variables, etc. In other words, the memory (54a)

stores the RTOS (23), the ready state watching program module (56), the power/energy control program module (57) and the application/middleware program module (58).

On the other hand, the volatile memory (54b) is used to process dynamic variables read/written by program instructions. In other words, the memory (54b) is provided with a dynamic memory area (157a) used for the EROS (23) a dynamic memory area (157b) used for the ready state watching program module (56), a dynamic memory area (157c) used for the power/energy control program module (57), and a dynamic memory area (157d) used for the application/middleware program module (58).

Figure 17:
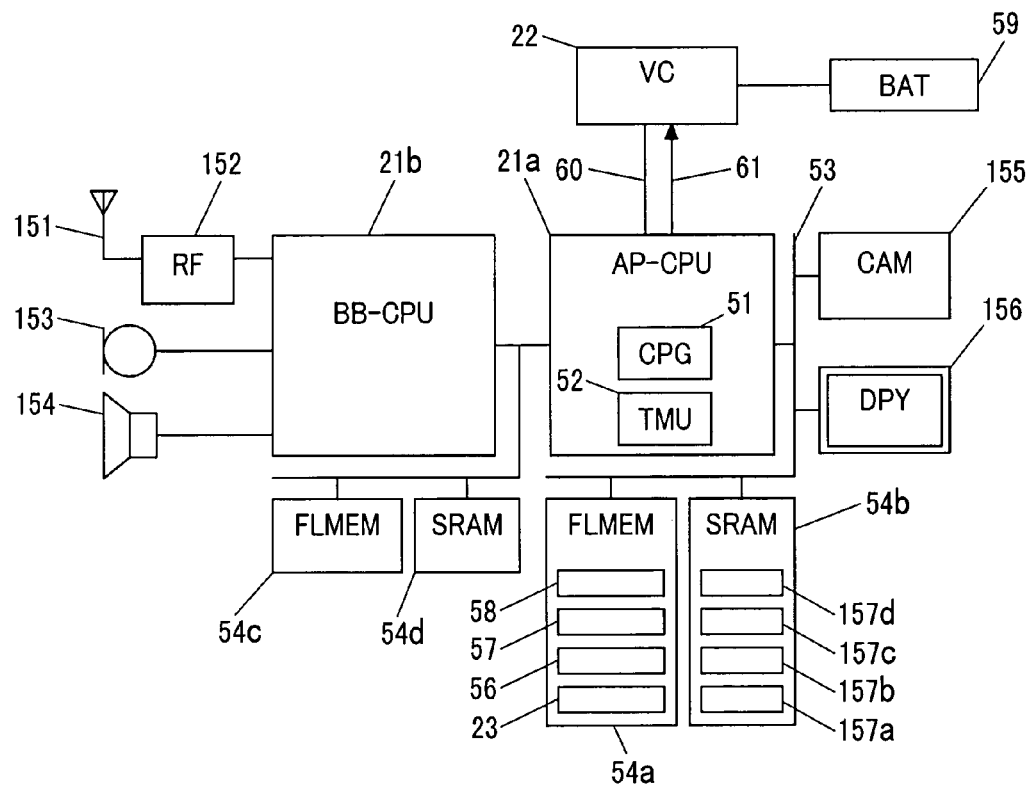
FIG. 17 is an information processing system that uses two processors in another embodiment of the present invention.
Figure 18:
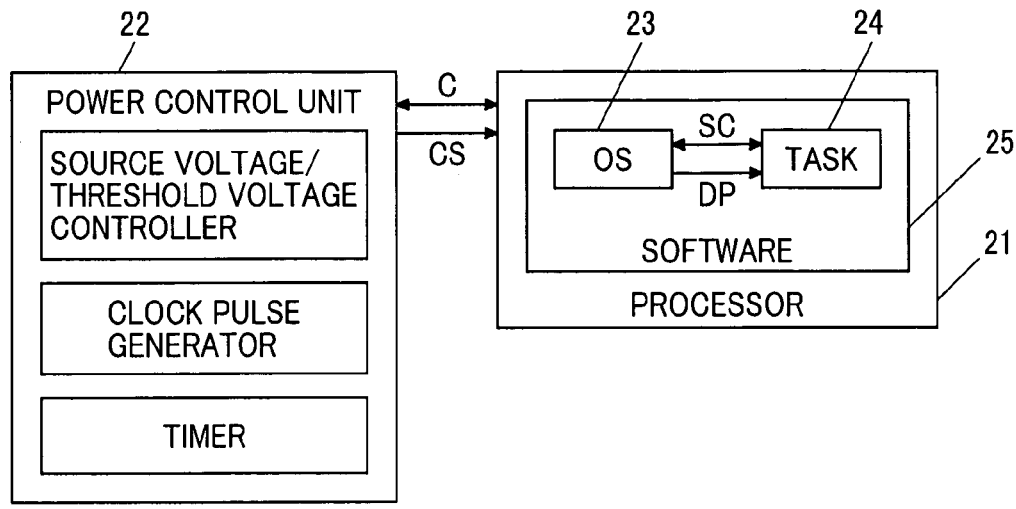
FIG. 18 is a typical chart of the patent document 1.
Figure 19:
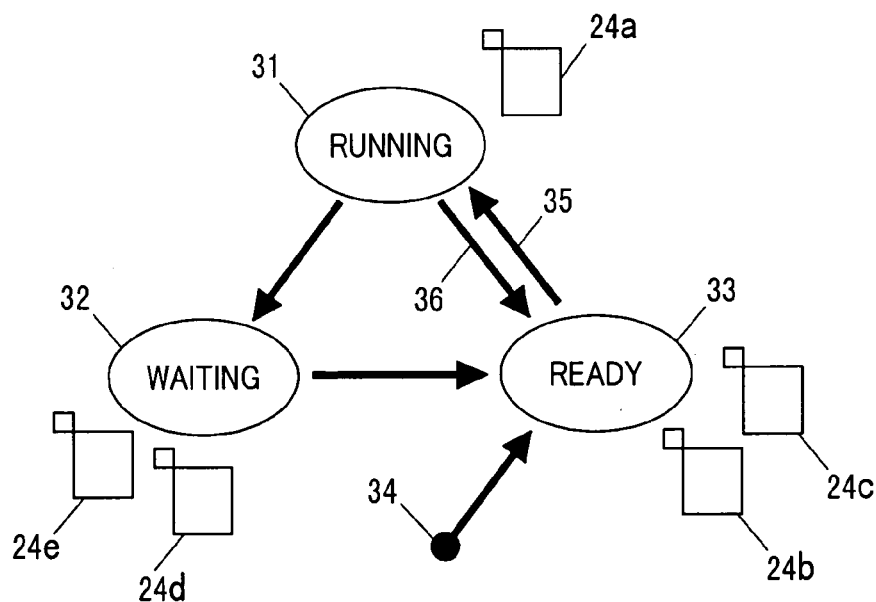
FIG. 19 is an illustration for describing how the state of an RTOS task changes.
Figure 20:
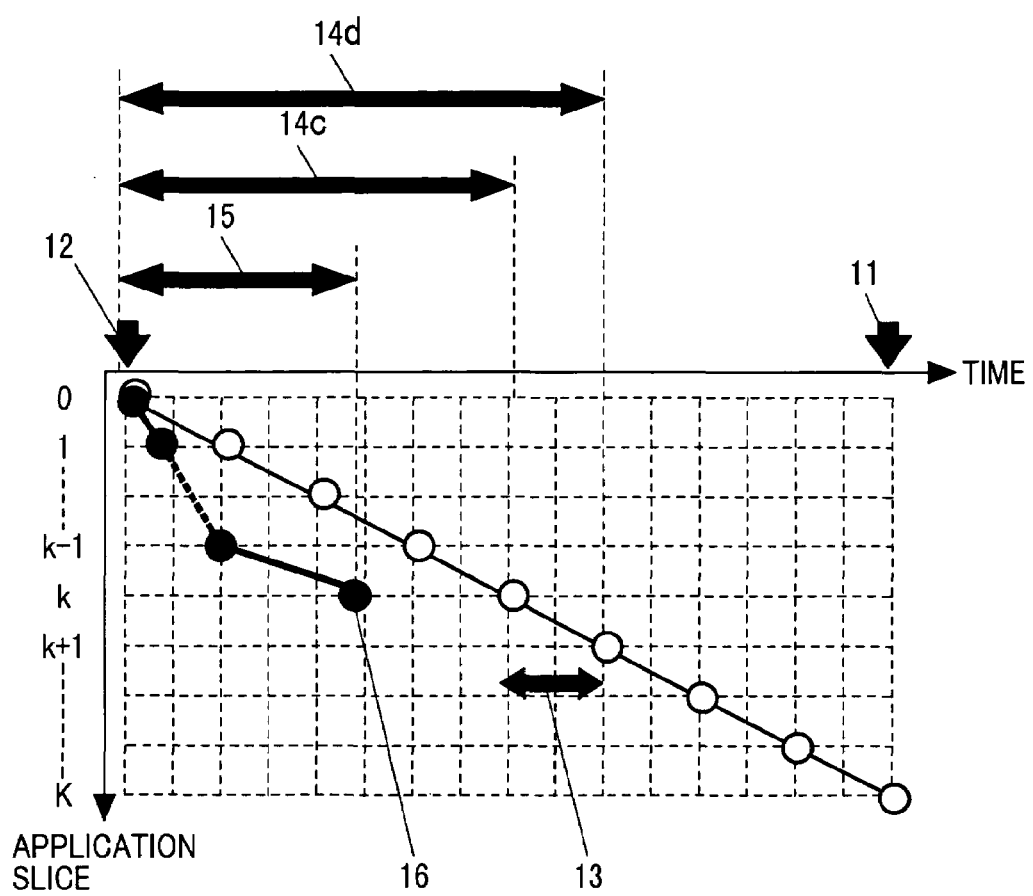
FIG. 20 is a concept chart of a power control program at a power control check point described in the patent document 1.
Figure 21:
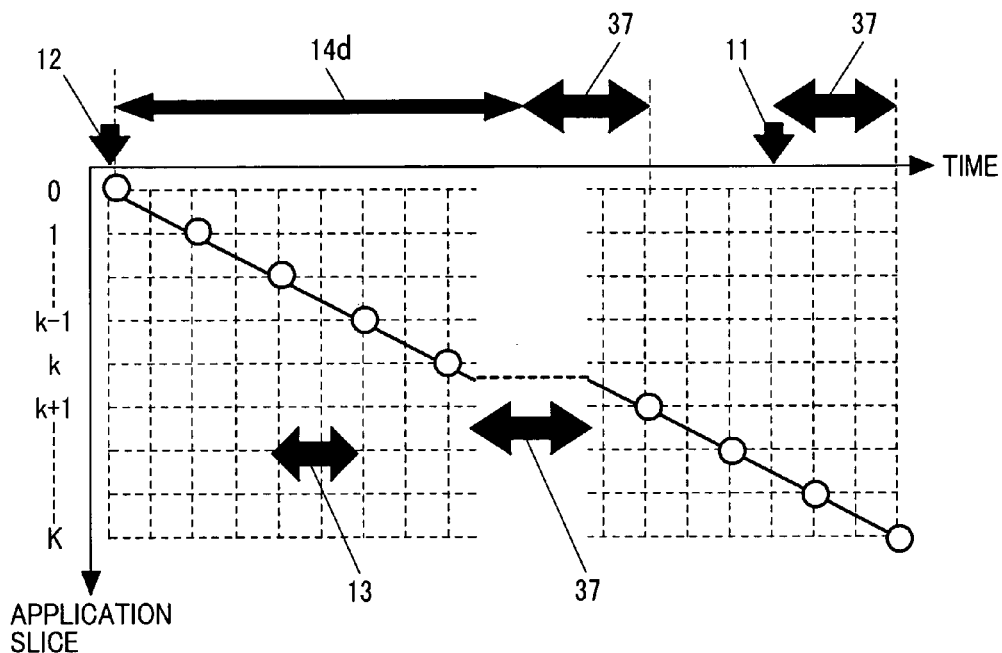
FIG. 21 is an illustration for describing how the starting time of a task is delayed just after the task goes into the running state.
Figure 22:
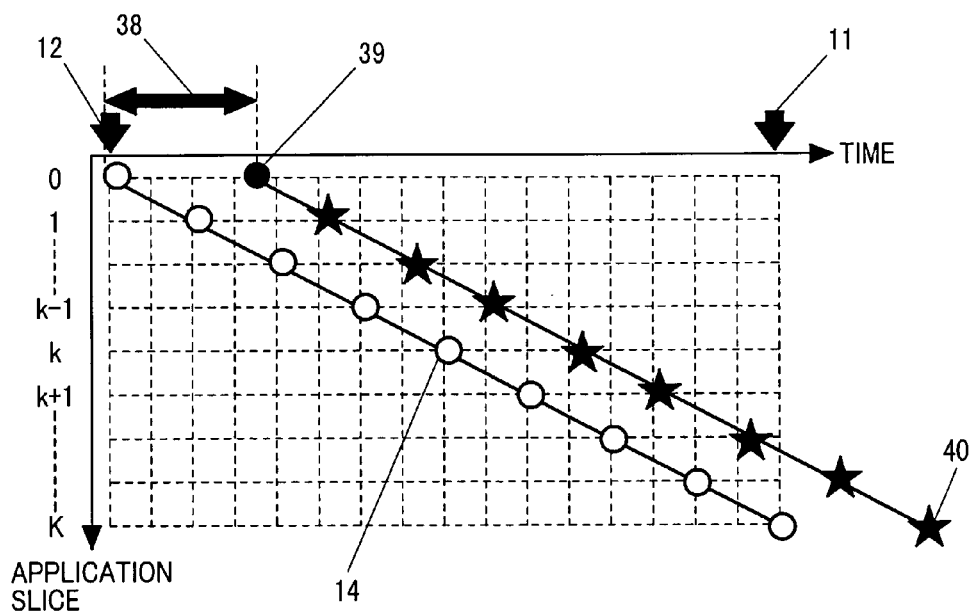
FIG. 22 is an illustration for describing how a task start-up time is delayed just after the task is shifted into the running state.

FIG. 17 shows an information processing system that uses two processors in another embodiment of the present invention. In the information processing system shown in FIG. 16, the load of the base band processor BB-CPU (21b) comes to become so heavy when it must cope with a communication signal processing, a communication protocol processing, and a multimedia processing simultaneously. To cope with such a situation, the information processing system in this embodiment is provided with a base band processor (21b) dedicated for communication processings and an application processor AP-CPU (21a) dedicated for multimedia processings. Also in this case, the present invention may apply to both of the base band processor (21b) and the application processor (21a).

While the preferred embodiments of the present invention has been described, it is to be understood that modifications will be apparent to those skilled in the art without departing from the spirit of the invention. For example, the present invention uses two types of power modes; the low power mode and the high power mode. However, the power mode is not limited only to those. In other words, the number of power modes may be more so that one of them is selected according to a difference between a WCET or virtual WCET and an integrated execution time obtained by adding up the processing ending time of each application slice, that is, according to time to spare. And, this system configuration will make it possible to control the object power more accurately. And, while both clock frequency and source voltage are changed according to the power mode, it is also possible to change only the clock frequency without changing the source voltage.

The present invention will thus be employed effectively for information processing systems, especially for information processing communication apparatuses.

What is claimed is:

1. An information processing system including a processor, a hardware timer built in said processor or provided outside said processor, and a clock pulse generator for supplying a clock to both of said processor and said hardware timer, wherein said hardware timer measures a processing time between starting and ending points of an application task;

wherein said application task is divided into a plurality of processing units;

wherein said processor compares a time required to process a predetermined one of said plurality of processing units of said application task with the worst case execution time of said plurality of processing units and changes the clock frequency output from said clock pulse generator according to a result of said comparison; and wherein said processor counts the number of application tasks set in a ready state when a different application task started up by an interruption during a former application task processing occupies the computing resource of said processor so as to enable said ready state watching task to raise both of said clock frequency and said source voltage when there is any application task set in the ready state other than said different application task to be executed and lower both of said clock frequency and said source voltage when there is no task set in the ready state.

2. The information processing system according to claim 1, wherein, if said processor is notified of existence of a different application task set in the ready state other than said application task when executing said application task, said application task compares the virtual worst case execution time that is earlier than said worst case execution time with said time required to process said predetermined processing unit.

3. The information processing system according to claim 2, wherein said processor lowers both of said clock frequency and said source voltage used for executing said current active application task if said difference between said worst case execution time or said virtual worst case execution time and said time required to process said predetermined processing unit is greater than a predetermined time and raise both of said clock frequency and said source voltage if said time difference is less than said predetermined time as a result of comparison between said worst case execution time or said virtual worst case execution time and said time required to process said predetermined processing unit.

4. The information processing system according to claim 1, wherein said processor, if it inquires said ready state watching task and knows existence of any ready state application task other than said different application task, enables said different application task to measure a preset virtual worst case execution time that is earlier than said worst case execution time and if it knows no existence of such a ready state task, enables said different task to measure how much time to spare is left according to the original worst case execution time.

5. The information processing system according to claim 4, wherein said processor lowers both of said clock frequency and said source voltage used to execute said current active task when said time to spare measured according to said worst case execution time or said virtual worst case execution time is greater than a predetermined time and raise both of said clock frequency and said source voltage if said execution time is less than said predetermined space time.

6. The information processing system according to claim 2, wherein said processor decides how much said worst case execution time should be set earlier in said virtual worst case execution time according to the number of ready state application tasks.

7. The information processing system according to claim 4, wherein said processor counts the number of ready state application tasks in response to an inquiry from said different application task and issues a system call to said different application task to notify the number of said ready state application tasks or existence/absence of them.

8. The information processing system according to claim 4,
wherein said processor operates under the control of an operating system.

9. An information processing system including a processor, a timer, a clock generator, and a clock voltage supply circuit,
wherein said timer measures an execution time of an application task to be executed by said processor;
wherein said application task is divided into a plurality of processing units;
wherein said information processing system manages the number of ready state application tasks;
wherein said information processing system manages the worst case execution time in which processing of each of said plurality of processing units should be completed if the number of ready state application tasks is less than a predetermined value and manages the virtual worst case execution time that is shorter than said worst case execution time for each of said plurality of processing units if the number of ready state application tasks is greater than said predetermined value when enabling said processor to execute said first application task,
wherein said information processing system has a first power mode and a second power mode that consumes less power than said first power mode;
wherein said information processing system, when said first application task ends a predetermined processing unit, compares the execution time of said predetermined processing unit measured by said timer with said worst case execution time or said virtual worst case execution time corresponding to said predetermined processing unit; and
wherein said information processing system operates in said second power mode if the difference between said worst case execution time or said virtual worst case execution time corresponding to said predetermined processing unit and the execution time of said predetermined processing unit is greater than a predetermined time and operates in said first power mode if said difference is less than said predetermined time.

10. The information processing system according to claim 9,
wherein the clock frequency of said processor is lower in said second power mode than in said first power mode; and
wherein the source voltage of said processor is lower in said second power mode than in said first power mode.

11. The information processing system according to claim 10,
wherein said information processing system that operates in said second power mode, when said first application task ends a predetermined processing unit, goes into said first power mode if the number of ready state application tasks is greater than a predetermined value.

12. An operating system for controlling an information processing system that includes a processor and a timer, said system comprising the steps of:
dividing an application task executed by said processor into a plurality of processing units and managing the number of ready state application tasks; and
managing the worst case execution time in which each of said plurality of processing units should be completed if the number of ready state application tasks is less than a predetermined value and managing the virtual worst case execution time that is shorter than said worst execution time corresponding to each of said plurality of processing units if the number of ready state application tasks is greater than said predetermined value when enabling said processor to execute a first application task,
wherein said information processing system has a first power mode and a second power mode that consumes less power than said first power mode;
wherein said operating system compares the execution time of said predetermined processing unit measured by said timer with said worst case execution time or said virtual worst case execution time corresponding to said predetermined processing unit when said first application task ends a predetermined processing unit, then operates said apparatus in said second power mode if the difference between said worst case execution time or said virtual worst case execution time corresponding to said predetermined processing unit and the execution time of said predetermined processing unit is greater than a predetermined time and operates said apparatus in said first power mode if said difference is less than said predetermined time.

13. The information processing system according to claim 12,
wherein said operating system shifts said information processing system that operates in said second power mode into said first power mode if the number of ready state application tasks exceeds a predetermined value when said first application task ends a predetermined processing unit.

* * * * *